United States Patent
Mazzei

(10) Patent No.: US 6,890,126 B2
(45) Date of Patent: May 10, 2005

(54) SUBSURFACE WATER/AIR IRRIGATION SYSTEM WITH PREVENTION OF AIR LOCK

(76) Inventor: Angelo L. Mazzei, 11101 Mountain View Rd., Bakersfield, CA (US) 93307

( * ) Notice: Subject to any disclaimer, the term of this patent is extended or adjusted under 35 U.S.C. 154(b) by 0 days.

(21) Appl. No.: 10/190,421

(22) Filed: Jul. 3, 2002

(65) Prior Publication Data

US 2004/0005193 A1 Jan. 8, 2004

(51) Int. Cl.$^7$ ............... E04B 13/00; A01G 25/06
(52) U.S. Cl. ............... 405/44; 405/45; 405/51
(58) Field of Search .................. 239/8, 9, 565; 137/888, 892, 896; 405/51, 36, 43, 44, 45; 47/48.5, 58.15 C, 62 R, 62 A, 62 C, 62 E, 62 N, 59 R

(56) References Cited

U.S. PATENT DOCUMENTS 3,797,741 A * 3/1974 Spencer ............... 239/542
4,123,800 A 10/1978 Mazzei
4,669,217 A * 6/1987 Fraze ............... 47/59 R
5,207,354 A * 5/1993 Hsu et al. ............... 239/66
5,863,128 A 1/1999 Mazzei
6,173,526 B1 1/2001 Mazzei

* cited by examiner

Primary Examiner—Michael Safavi
(74) Attorney, Agent, or Firm—Donald D. Mon

(57) ABSTRACT

An underground irrigation system which supplies beneath the surface of the soil under or near the roots of a growing crop, water infused with micro bubbles of gas (usually air). A mixer/injector injects and mixes gas into water to form a mixed stream that flows from a header into a plurality of branches. The mixed stream emits from the branches. An air bleed releases gas from the system which has separated from the mixed stream.

8 Claims, 2 Drawing Sheets

SUBSURFACE WATER/AIR IRRIGATION SYSTEM WITH PREVENTION OF AIR LOCK

FIELD OF THE INVENTION

An underground irrigation system which supplies both water and air to the soil beneath and around root systems of growing plants.

BACKGROUND OF THE INVENTION

The simultaneous injection of intimately mixed water and air into subsurface soil is described in U.S. Pat. No. 6,173,526, issued to Angelo Mazzei. The objective is to provide both substances in proper proportions directly to the root systems of plants. The term "root system" includes roots of plants such as bushes and vines that provide their crop above the surface, and root crops in which the crop itself is considered to be the root system. Examples of the latter are potatoes, turnips, carrots and tubers.

Such mixer/injectors inject air into a water supply stream in the form of "micro bubbles" of very small size to produce an intimately "mixed stream" of water and bubbles. The bubble sizes are so small as to discourage their separating out of the water, or to aggregate together in larger bubbles. While these undesired effects are "discouraged", and very small bubbles remain suspended in the water for long periods of time, the separation of air from the water is not completely prevented. Then, in a system which relies on simultaneous emission of air and water in an established ratio for its utility at the point of application, accumulated separated air can result in disruption of the system. In some circumstances it can entirely prevent the emission of a mixed stream of air and water in some regions of the system.

Irrigation systems of interest are sometimes called "drip irrigation", even though the emission is underneath the surface. Systems according to this invention have proved to be very effective on commercial crops. With its use, crops such as bell peppers and strawberries have reached the market many days earlier, and thereby command premium prices compared with later product that was grown with conventional irrigation. Consistent increases in gross crop yields on the order of 10% over a season have frequently been observed. Increases as high as 30% have also been observed.

These irrigation systems are intended principally for commercial installations where one header can serve as many as 40 branches in parallel rows. Each branch may be several hundred feet long. Water and air are both fluids, and the ratio of the water to the air in the mixed stream where it is emitted into the soil is of considerable importance. If air is missing from the mixture in some parts of some branches, or if some branches emit only air, or only water, the nearby areas will produce less product, and the product may be of lesser quality. It is important that an irrigation system which extends over a broad area provide a reasonably consistent product. Unfortunately, differences in some areas may not become evident until after some damage is done. It is an object of this invention to alleviate the tendency of separated air to accumulate in local regions in the system, a situation that could impede the passage of water that is correctly laden with micro bubbles, or could cause emission of water without air, or air without water.

The principal region where this impediment may occur is in the header at one or both of its ends. At this point or points, separated air can collect and back up the system by displacing the air/gas mixture, or by injecting sudden loads of air into the stream to create hammer and inconsistency of flow. It is also possible, although less so, for separated air to accumulate somewhere in the branches. It is an object of this invention to overcome these problems.

BRIEF DESCRIPTION OF THE INVENTION

This invention is incorporated into an irrigation system comprising a header and a group of branches. The branches include emitters which are intended to emit a correctly "mixed stream" of water and bubbles of gas. The branches usually are parallel to one another, and are buried in the soil beneath or adjacent to the root systems of growing plants. An irrigation system of this type is shown in the said Mazzei U.S. Pat. No. 6,173,526, which is incorporated herein in its entirety by reference for its showing of the irrigation system and of its components. This instant invention is an improvement to its system.

The header is supplied with a mixed stream of water containing micro bubbles of air. The supply stream of water receives a metered amount of air (or other gas) from a mixer/injector. The mixer/injector forms and distributes a large number of micro bubbles into the supply stream to create the mixed stream. A mixer/injector according to any one of Mazzei U.S. Pat. Nos. 4,123,800 and 5,863,128, all of which are incorporated herein in their entirety by reference for their showing of such mixer/injectors, can be used.

According to a feature of this invention, an air bleed which passes gas without passing excessive water interconnects the inside of the irrigation system to atmosphere. Its function is to pass and discharge accumulated excess air from the header, so the air cannot accumulate and interfere with the normal operation of the branches.

According to a preferred but optional feature of the invention, the air bleed is a liquid level-sensing air bleed valve responsive to an interface between gas and liquid, so as to open and discharge separated gas, while not passing water.

The above and other features of this invention will be fully understood from the following detailed description and the accompanying drawings, in which:

DETAILED DESCRIPTION OF THE INVENTION

Figure 1:
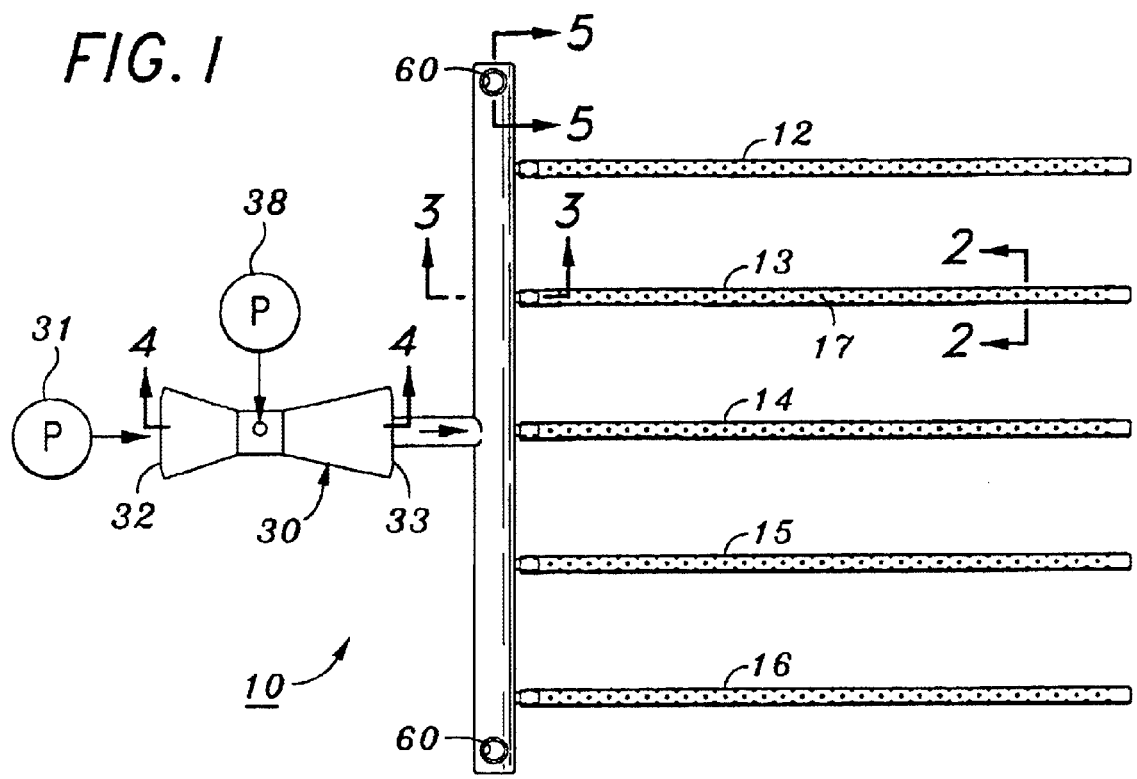
FIG. 1 is a schematic plan view of an injection system according to the invention, with the earth removed.

An irrigation system 10 according to the invention is shown in FIG. 1. It includes a tubular header 11 and a plurality of tubular branches 12–16. The inside diameter of the header is usually quite large, perhaps 8 to 12 inches, because it may supply as many as 40 branches that are usually ¾ inches in diameter or smaller. The header and branches are tubular in the sense that they have a continuous lumen for fluid flow. They need not be circularly sectioned.

The branches are smaller, because they are to be buried in the soil beneath or adjacent to the root systems. Often they will be made of flexible, or semi-flexible material, although they may instead be solid pipe. In any event, the branches will include emitters (shown only as openings 17) spaced apart along the branch. There are many types of emitters and structures for the branches, which are well-known in the art.

Tape-like conduitry, and even porous conduitry can be used. The term "emitter" is intended to include all types of orifices which permit the passage of some of the mixed stream at a controlled rate.

Preferably the emitters will face upwardly so that air will be less likely to accumulate in the branches. If desired, air bleeds can be placed in the branches, usually near their ends, although this will rarely be done.

Figure 2:
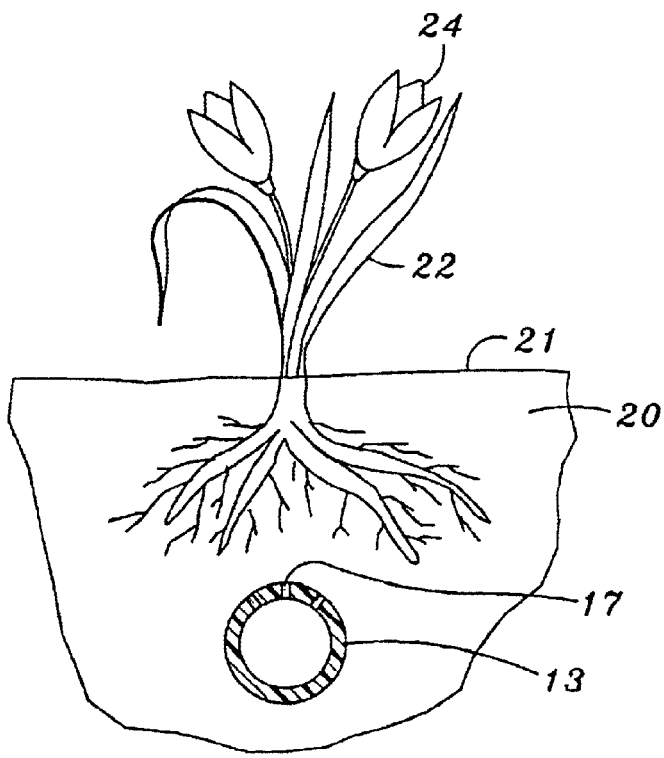
FIG. 2 is a cross-section taken at line 2—2 in FIG. 1 showing the placement of the branches in the earth.

FIG. 2 shows the presently preferred use of this system. The branches, and especially their emitters, are placed below the surface, embedded in the soil. This enables the mixed stream to emit as such into the ground beneath, or adjacent to the roots of the plants, where the plants' oxygen need will be supplied. Persons skilled in the art will recognize this as a substitute for or supplement to the atmospheric oxygen which reaches the root systems as the consequence of conventional irrigation practice.

Branch 13 is shown in FIG. 2 embedded in soil 20 beneath surface 21. A plant 22 having roots 23 (schematically shown), below the surface and with a crop 24 above the surface are above an emitter 17.

Figure 3:
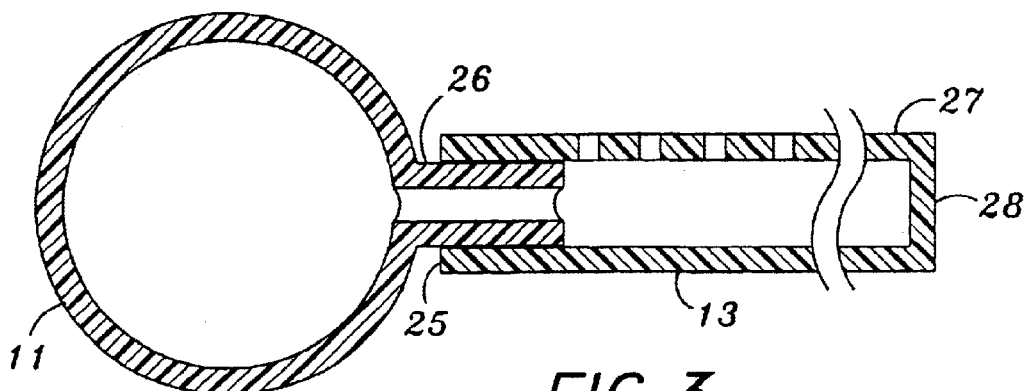
FIG. 3 is a cross-section taken at line 3—3 in FIG. 1.

FIG. 3 shows branch 13 with one end 25 connected to a nipple 26, and its other end 27 closed by a closure 28. The relative sizes of the header and of the branch are disproportionate for purposes of illustration.

Figure 4:
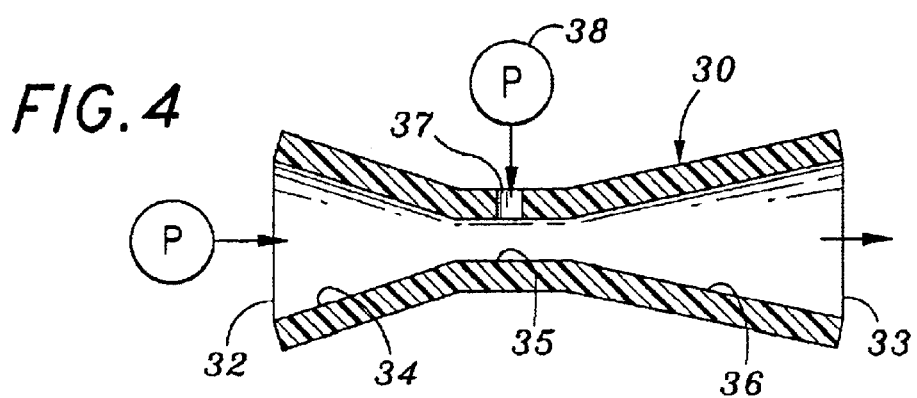
FIG. 4 is a schematic cross-section of the mixer/injector, taken at line 4—4 in FIG. 1.

A mixer/injector 30 receives a supply stream of water from a source 31 such as a pump or reservoir. As schematically shown in FIG. 4, the mixer/injector has an inlet end 32 and an outlet end 33. As best shown in Mazzei U.S. Pat. No. 5,863,128 it has a constricting region 34, a throat 35 (preferably cylindrical), and a diverging outlet portion 36. An air inlet port 37 enters the throat, preferably adjacent to the converging portion. Air or some other gaseous additive is supplied from a gas source 38 (perhaps the atmosphere). Vanes shown in Mazzei U.S. Pat. No. 5,863,128 can advantageously be included in either or both of said constricting and diverging portions. The outlet end 33 of the mixer/injector discharges into the header.

Figure 5:
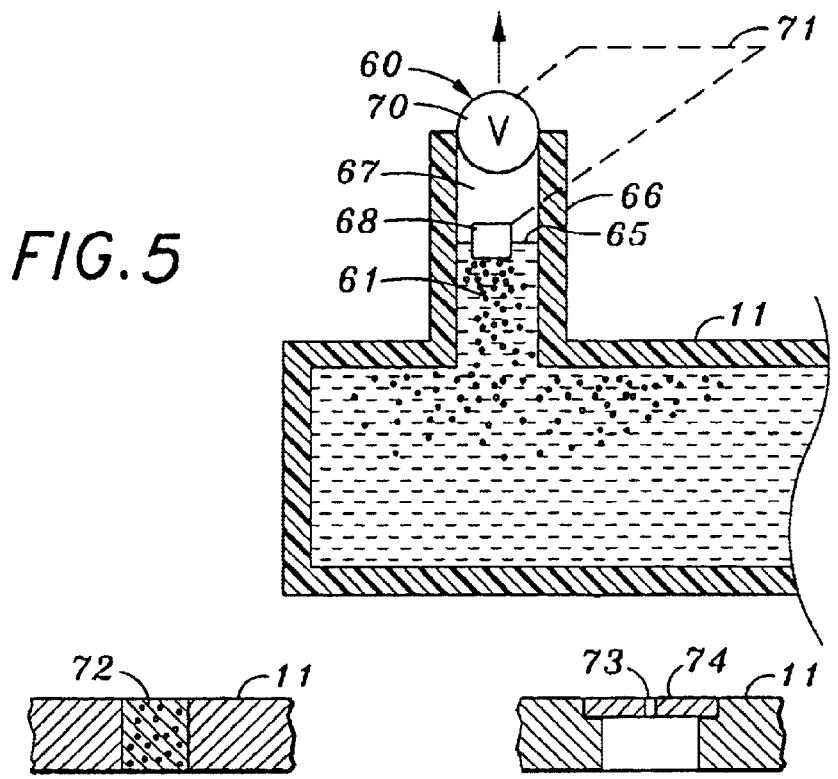
FIG. 5 is a cross-section, partly in schematic notation, taken at line 5—5 in FIG. 1.

An air bleed in the form of an air bleed valve 60 is schematically shown in FIG. 5. A region of the header formed by a riser 66 is at an upper elevation where gas that has left suspension in water will gather. Preferably such a riser and bleed valve will be provided at more than one location on the header, such as at both ends as shown.

The riser 66 is a preferred means for collection of separated gas, because it provides a disciplined location for gas to collect and in which a liquid level can sensibly be maintained. The purpose of this region or regions (which can merely be an upper region in the header itself), allows the formation of an interface 65 between the water/gas mixture 61 and free gas 67. A float 68 floats at the interface. When gas is bled from the region, the interface will rise. When gas is trapped, it will press the interface down. Unless bled off, this free gas can back up and prevent flow of the mixed stream into one or more of the branches. It can even enter the branches to disrupt the ordinary established flow of the stream through the branches to the emitters. Reduction of free gas from the system is the objective of this invention.

Valve 60 includes valve workings 70 of any suitable type which are functionally related to the elevation of the float. The workings are off-on valve components which may be adjusted to allow various rates of flow. When the interface is high enough, there is insufficient gas to be worth bleeding off.

Dashed line 71 indicates the control relationship between the float and the valve workings. Such float valves are well-known and require no detailed description here. The valve workings discharge to atmosphere when air is the gas to be discharged.

The air bleed valve 60 is a simple, preferred device for use as an air bleed. It operates by opening when air is to be bled, and closing when it is not. It has the advantage of discrimination between air and water, so as not to leak water from the system.

Figure 6:
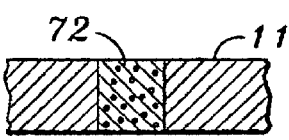
FIG. 6 shows another form of air bleed.
Figure 7:
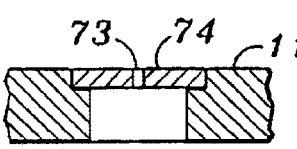
FIG. 7 shows yet another form of air bleed.

However, other means for this purpose are available. For example, a porous plug 72 (FIG. 6) in the upper wall of the header, with pores of such size as to pass gas but not water can be used. Another example is a small always-open orifice 73 formed in a plate 74 in the wall of the header. Its size should be large enough to pass air, but small enough either that water will not pass through it, or that if there is a water bleed, it will be so small as to be insignificant.

This invention is not to be limited by the embodiments shown in the drawings and described in the description, which are given by way of example and not of limitation, but only in accordance with the scope of the appended claims.

I claim:

1. In an irrigation system which includes a mixer/injector adapted to receive a supply stream of pressurized water, inject air into it, and expel a mixed stream of said water infused with micro bubbles of gas suspended therein, a tubular header receiving said mixed stream, a plurality of tubular branches extending from said header, said branches including spaced-apart emitters for limited flow of said mixed stream from their respective branch, the entire system extending from said mixer/injector to said emitters being intended to be maintained under positive, above atmospheric pressure, whereby said mixed steam of water and air is discharged from said emitters, the improvement comprising:

said header having a region above a water/gas interface into which air, which may have separated from the mixed stream, will collect, and an air bleed from said region operative to bleed said separated air from the header while retaining said mixed stream under said pressure.

2. Apparatus according to claim 1 in which said air bleed is provided adjacent to an end of said header.

3. Apparatus according to claim 2 in which a plurality of said air bleeds is provided at spaced-apart locations on said header.

4. Apparatus according to claim 1 in which said air bleed is a bleed valve comprising a float which floats in said water on said interface, and valve workings being responsive to the level of the interface, thereby releasing air from said region when the amount of air collected in said region causes said interface to stand below a predetermined level.

5. Apparatus according to claim 4 in which said region is provided in a riser tube which interconnects with and rises from the top of said header.

6. Apparatus according to claim 5 in which a plurality of said bleed valves and risers are provided at spaced apart locations on said header.

7. Apparatus according to claim 1 in which said air bleed comprises a restricted orifice through said header which will pass air but not water.

8. Apparatus according to claim 1 in which said air bleed is a porous plug fitted in a hole through the wall of said header above said interface, the porosity of said plug being such as to pass gas but not water.

* * * * *